(12) United States Patent
Nemecek et al.

(10) Patent No.: US 7,047,181 B1
(45) Date of Patent: May 16, 2006

(54) EXTERNAL POWER DETECT AND SUPPLY

(75) Inventors: Craig Nemecek, Seattle, WA (US);
Steve Roe, Woodinville, WA (US)

(73) Assignee: Cypress Semiconductor Corporation, San Jose, CA (US)

( * ) Notice: Subject to any disclaimer, the term of this patent is extended or adjusted under 35 U.S.C. 154(b) by 803 days.

(21) Appl. No.: 09/989,812

(22) Filed: Nov. 19, 2001

(51) Int. Cl.
*G06F 9/455* (2006.01)
*G06F 11/00* (2006.01)

(52) U.S. Cl. .......................... 703/28; 714/28
(58) Field of Classification Search ............ 703/28; 714/28
See application file for complete search history.

(56) References Cited

U.S. PATENT DOCUMENTS 5,640,337 A * 6/1997 Huang et al. ............... 703/23

6,499,122 B1 * 12/2002 Coomes ..................... 714/724

OTHER PUBLICATIONS

B. Laquai, H. Richter, H. Werkmann, "A Production-oriented Measurement Method for Fast and Exhaustive Iddq Tests", IEEE 1997, pp. 279-286.*

* cited by examiner

*Primary Examiner*—Paul L. Rodriguez
*Assistant Examiner*—Dwin M. Craig

(57) ABSTRACT

A power management system and circuit comprising instructions stored in computer memory for the prevention of simultaneous coupling of more than one power source to a device under test (DUT). Instructions stored in memory prevent the simultaneous application of power to the DUT from both the in circuit emulator power grid and an external power source. External power applied to the DUT results in at least one activity signal detected by the computer. If no activity signal appears, a fault condition in the DUT is interpreted. If an activity signal is detected, testing continues under control of Debug Software.

17 Claims, 7 Drawing Sheets

EXTERNAL POWER DETECT AND SUPPLY

BACKGROUND OF THE INVENTION

1. Field of the Invention

This invention relates generally to the field of in circuit emulation (ICE). More specifically, the present invention relates to power sources used to activate a device under test (DUT) on a test pod used in an ICE system. An embodiment of the present invention relates to protection of a DUT on a test pod from the simultaneous application of more than one power source.

2. Related Art

In circuit emulation (ICE) has been used by software and hardware developers for a number of years as a development tool to emulate the operation of complex circuit building blocks. Such ICE is most commonly used currently to analyze and debug the behavior of complex devices such as microcontrollers and microprocessors that have internal structures that are far too complex to readily model using computer simulation software alone.

An exemplary conventional ICE arrangement used to model, analyze and debug the operation of a circuit such as a microcontroller consists of a host computer (e.g., a personal computer) connected to an ICE which is further connected to a pod providing coupling to a circuit or microcontroller to be tested.

Existing ICE systems have a number of disadvantages and limitations. Firstly, the power required to operate a DUT is typically supplied by the ICE power grid. In general, the ICE power grid may not be capable of supplying power at various voltage levels and at power ratings required for different circuit designs. In order to overcome such disadvantages, the pod on which a DUT is mounted may have provisions for connection to external power sources.

However, the ability to apply external power to the pod offers a second disadvantage. That is, the possibility of damage to the DUT as well as the ICE system may occur if external power is erroneously or inadvertently applied simultaneously with power from the ICE power grid.

Furthermore, existing in circuit emulation systems do not always provide the ability to determine if power is being correctly applied to a DUT.

SUMMARY OF THE INVENTION

Accordingly, what is needed is an ICE system that may be used to supply power to a DUT in accordance with the design requirements of the circuit. What is also needed is an ICE system that may be used to detect a condition whereby a power source external to the in circuit emulator is being used to supply power to a DUT. What is further needed is an ICE system that prevents the simultaneous application of power to a DUT from both the ICE and an external power source. Additionally what is needed is an ICE system that will sense a fault condition in a DUT and remove power being applied to the DUT. The present invention provides a novel solution to these needs.

One embodiment is described as a power management system and circuit comprising instructions stored in computer memory for the prevention of simultaneous coupling of more than one power source to a DUT. An unpowered DUT residing on a pod is coupled to an ICE having a power grid which may be used to apply power to the DUT. Power for the DUT may also be applied directly to the DUT from a power source external to the ICE. Instructions stored in memory prevent the simultaneous application of power to the DUT from both the ICE power grid and an external power source. In the initial phase of testing, the Debug Software performs an acquire of the DUT to determine whether external power has been applied. External power applied to the DUT results in at least one activity signal detected by the computer, a bit is stored in the instruction set to prevent the application of ICE power and testing of the DUT continues under control of the Debug Software. In the absence of an activity signal from the DUT, the DUT is powered from the ICE grid and detection of activity signals is continued. If no activity signal appears, the computer sets a bit in the instruction set that is interpreted as a fault condition in the DUT, and the Debug Software terminates testing. If an activity signal is detected by the computer, testing continues under control of the Debug Software.

More specifically, one embodiment of the present invention includes a processor and an ICE coupled to a bus, a DUT coupled to the ICE and a memory coupled to the bus comprising instructions that when executed implement a method of supervising the coupling of power to the DUT. The DUT is positioned on a pod such that power to activate the DUT can be supplied from the ICE power grid by means of a CAT5 cable or from an external power source. CAT5 cable is typically unshielded twisted pair, containing four twisted wire pairs. Fast Ethernet (100Base-T) and 10Base-T use only two of these pairs, leaving two pairs unused. Gigabit Ethernet (1000Base-T) uses all four pairs. Similar to full-duplex Fast Ethernet, 1000Base-T transmits and receives simultaneously. The difference is that 1000Base-T uses four transmit/receive pairs, each pair operating at 250M bit/sec. In one embodiment of the present invention, the DUT is a microcontroller.

Testing is initiated with the ICE power grid deactivated, and Debug Software performs an acquire of the DUT to determine if power is applied from an external source. The detection of an activity signal, such as a clock, indicates the application of power to the DUT from an external power source. In this instance, a bit is stored in the instruction set to prevent coupling of the ICE power grid to the DUT, and the Debug Software continues the test routine.

If the DUT is not powered from an external source, there will be no activity signal. Power from the ICE power grid is then applied to the DUT and the Debug Software will monitor for a resulting activity signal. Detection of an activity signal will indicate normal operation, and the Debug Software continues the test routine. If no activity signal is detected, a bit is stored in the instruction set that is interpreted as a fault condition in the DUT. Power from the ICE is decoupled from the test circuit and the testing operation is terminated. By these means, the simultaneous application of two different power sources to the DUT is avoided.

Another embodiment of the present invention includes a host computer comprising a memory coupled to an ICE having a power grid capable of activating a DUT positioned on a pod. The pod is coupled to the ICE with a CAT5 cable, and in addition is coupled to an external power supply capable of activating a DUT. The host computer memory comprises instructions that when executed implement a method of supervising the coupling of power to the DUT. More specifically, the simultaneous application of power to the DUT from both the ICE power grid and the external power source is prevented.

The Debug Software initiates testing by withholding the application of ICE power from the DUT and performing an acquire of the DUT. The presence of an activity indicator, such as a system clock, signifies the presence of DUT activation by means of an external power source, and Debug Software continues the test routine.

If the DUT is not powered from an external source, there will be no activity signal. Power from the ICE power grid is then applied to the DUT and the Debug Software will monitor for a resulting activity signal. Detection of an activity signal will indicate normal operation, and the Debug Software continues the test routine. If no activity signal is detected, a bit is stored in the instruction set that is interpreted as a fault condition in the DUT. Power from the ICE is decoupled from the DUT and the testing operation is terminated.

In one embodiment of the present invention, the ICE comprises a field programmable gate array (FPGA) that can be programmed to emulate a microcontroller located on the test pod such that the programmed FPGA and the microcontroller operate in lock step under the Debug Software test routine.

The present invention provides these advantages and others not specifically mentioned above but described in sections to follow.

DETAILED DESCRIPTION OF THE INVENTION

Figure 1:
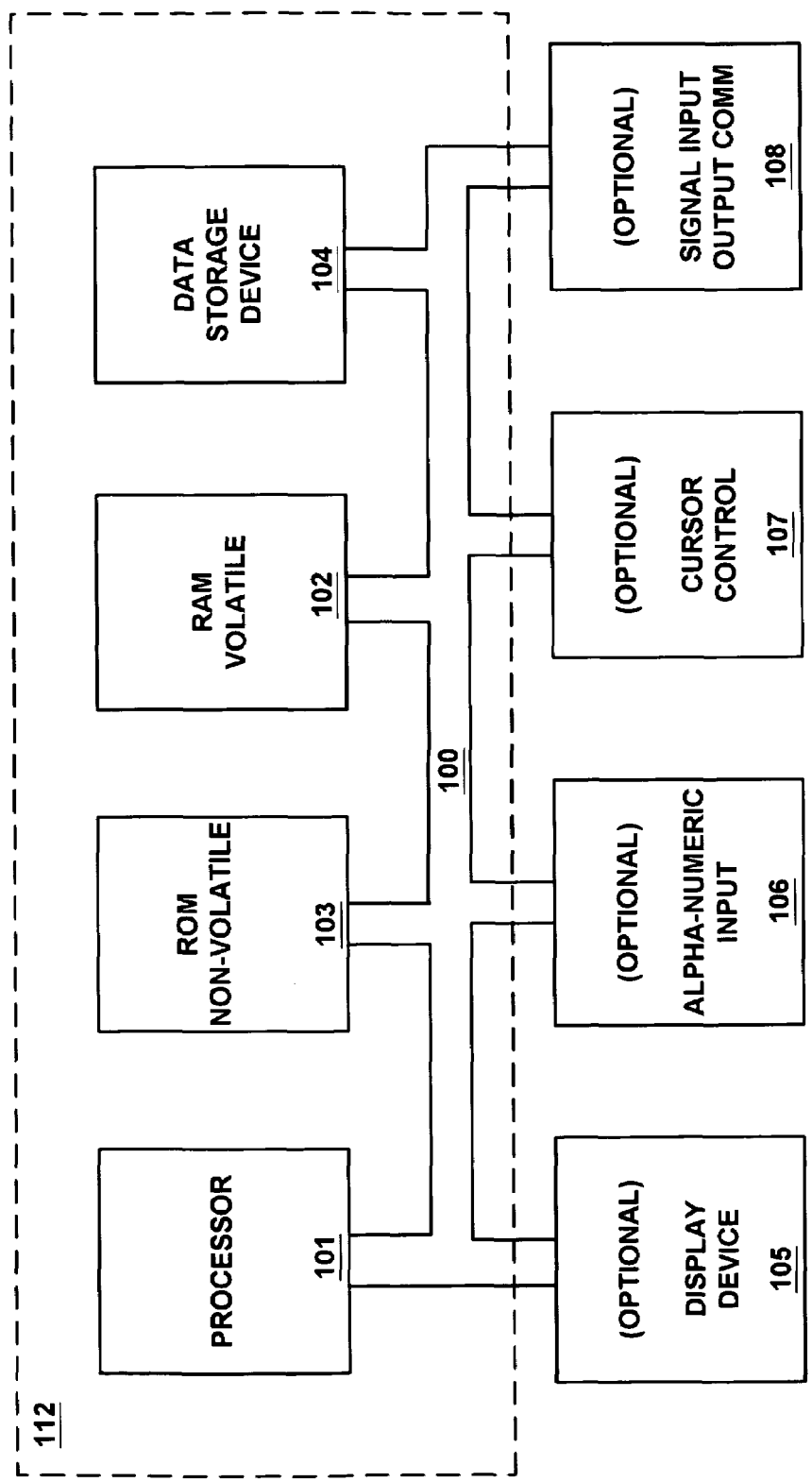
FIG. 1 is a general purpose computer system on which embodiments of the present invention may be implemented.

In the following detailed description of the present invention, external power detect and supply, numerous specific details are set forth in order to provide a thorough understanding of the present invention. However, it will be obvious to one skilled in the art that the present invention may be practiced without these specific details. In other instances well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those utilizing physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "checking," "comparing," "accessing," "processing," "computing," "suspending," "resuming," "translating," "calculating," "determining," "scrolling," "displaying," "recognizing," "executing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Computer System 112

Aspects of the present invention, external power detect and supply, are discussed in terms of steps executed on a computer system. Although a variety of different computer systems can be used with the present invention, an exemplary computer system 112 is shown in FIG. 1.

Exemplary computer system 112 comprises an address/data bus 100 for communicating information, a central processor 101 coupled with the bus for processing information and instructions, a volatile memory 102 (e.g., random access memory) coupled with the bus 100 for storing information and instructions for the central processor 101 and a non-volatile memory 103 (e.g., read only memory) coupled with the bus 100 for storing static information and instructions for the processor 101. Computer system 112 also includes a data storage device 104 ("disk subsystem") such as a magnetic or optical disk and disk drive coupled with the bus 100 for storing information and instructions and a display device 105 coupled to the bus 100 for displaying information to the computer user.

The display device 105 of FIG. 1 utilized with the computer system 112 of the present invention may be a liquid crystal device, other flat panel display, cathode ray tube, or other display device suitable for creating graphic images and alphanumeric characters recognizable to the user.

Also included in computer system 112 is an alphanumeric input device 106 including alphanumeric and function keys coupled to the bus 100 for communicating information and command selections to the central processor 101. Generally, alphanumeric input device 106 is called a keyboard or keypad. System 112 also includes a cursor control or directing device 107 coupled to the bus for communicating user input information and command selections to the central processor 101. Within the context of the present invention, the cursor directing device 107 can include a number of implementations including a mouse device, for example, a trackball device, a joystick, a finger pad (track pad), an electronic stylus, an optical beam directing device with optical receiver pad, an optical tracking device able to track the movement of a user's finger, etc., or any other device having a primary purpose of moving a displayed cursor across a display screen based on user displacements.

Computer system 112 of FIG. 1 also includes an optional signal input/output communication device 108 coupled to the bus 100. Communication device 108 may represent an external test device such as an ICE, or a field programmable gate array (FPGA). Communication between the optional signal input/output communication device 108 and the bus 100 may be accomplished using a standard PC interface such as a parallel printer port connection or a universal serial port (USB) connection.

External Power Detect and Supply

Figure 2:
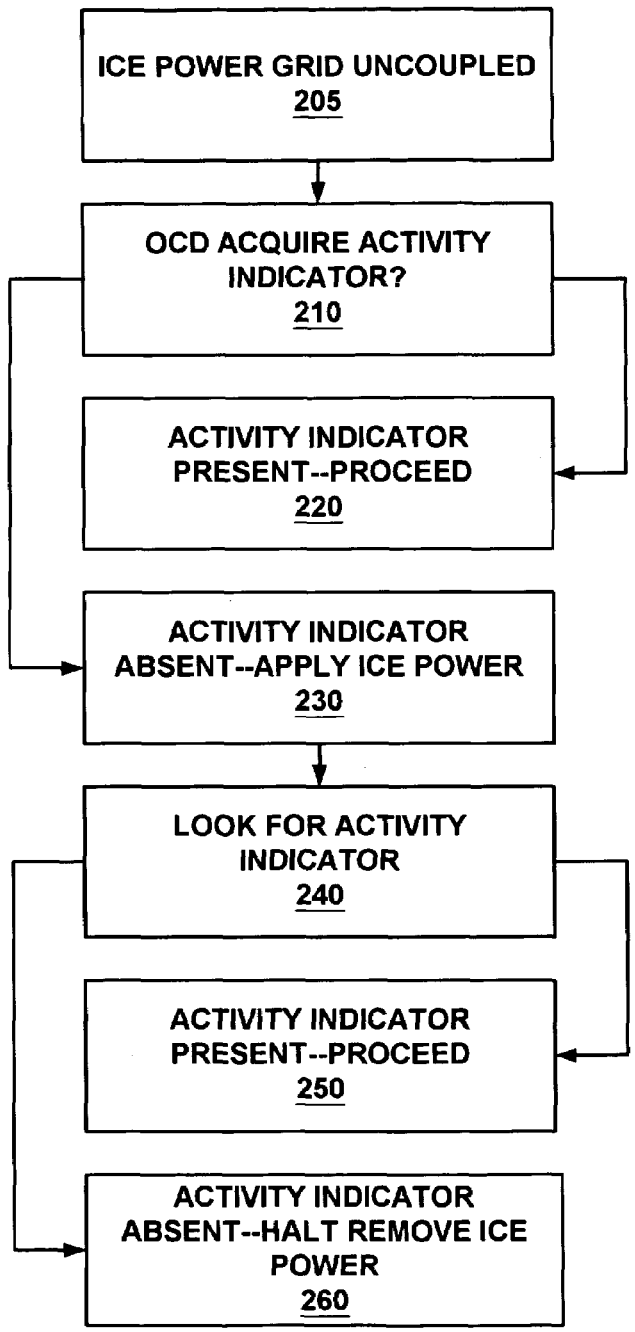
FIG. 2 illustrates an external power detect and supply algorithm in block diagram form according to one embodiment of the present invention.

An algorithm 200 for applying power to a device under test (DUT) is illustrated in block diagram form in FIG. 2. A device under test residing on a pod is coupled to an ICE under the control of a computer. In one embodiment, the ICE is coupled to the pod using a CAT5 cable. The ICE has a power grid capable of supplying the necessary power to activate the DUT, and software referred to as the Debug Software stored in the computer contains instructions for applying power from the ICE. Provisions for coupling an external power source to the pod for the purpose of supplying power to the DUT are also present. The algorithm is devised such that the simultaneous application of power to the DUT from the ICE power grid and an external source is prevented.

Testing is initiated in step 205 with the ICE power grid active but not coupled to the DUT. The Debug Software performs an acquire of the DUT in step 210 and looks for an activity indicator. Detection of a signal such as a clock indicates activity of the DUT due to the application of power from an external source. In the presence of an activity indicator, a signal is generated to prevent application of power from the ICE power grid to the DUT and the algorithm proceeds to step 220 where testing under control of the Debug Software continues.

If an activity indicator such as a clock is not present in step 210, external power is not being supplied to the DUT and the algorithm proceeds to step 230. The ICE power grid is coupled to the DUT in step 230, and after the application of power the Debug Software looks for an activity indicator in step 240.

Detection of a signal such as a clock in step 240 indicates activity of the DUT due to the application of power from the ICE power grid in step 230. The algorithm then proceeds to step 250 where testing under control of the Debug Software continues.

The absence of an activity signal from the DUT in step 240 after the application of power from the ICE power grid is an indication of a fault condition concerning the DUT. The algorithm then proceeds to step 260 wherein power from the ICE power grid is removed from the DUT. Also, in step 260 a signal is generated to indicate the existence of a fault condition and testing of the DUT is halted.

Figure 3:
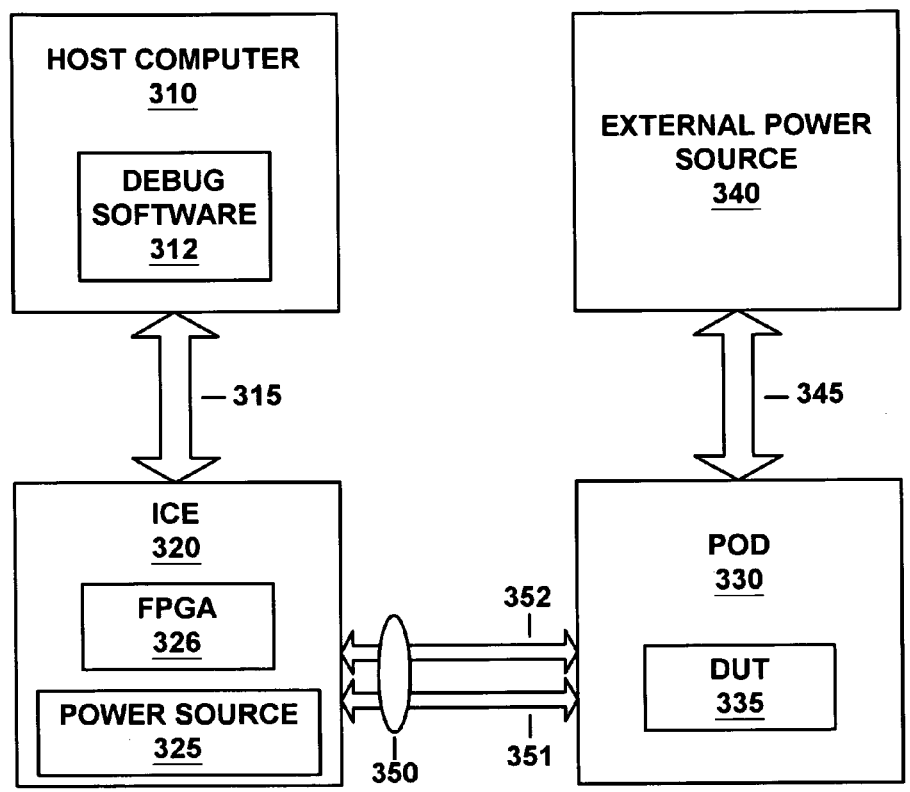
FIG. 3 illustrates a high level block diagram of a computer controlled system for supervising the coupling of power to a test circuit according to one embodiment of the present invention.

FIG. 3 illustrates a high level block diagram 300 of a computer controlled system for supervising the coupling of power to a test circuit 335 according to one embodiment of the present invention. A host computer 310 comprises instructions, Debug Software 312, stored in memory that when executed implement a method of supervising the coupling of power to a test circuit 335 disposed accordingly on a pod 330. The host computer 310 is coupled to an ICE 320 by cabling 315.

The ICE 320 comprises a power grid 325 capable of supplying the power necessary for operation of the test circuit 335. In the present embodiment, coupling between the ICE 320 and the pod 330 is a CAT5 cable 350, at least one line of which 352 is for the application of ICE grid power to the test circuit 335 and at least one line of which 351 is for the communication of signals between the ICE 320 and the pod 330. An external power supply 340 capable of supplying the power necessary for operation of the DUT 335 is coupled to the pod 330 by means of cabling 345.

In one embodiment of the present invention, the DUT 335 is a microcontroller, and a field programmable gate array (FPGA) 326 disposed on the ICE 320 may be programmed to emulate the microcontroller. The emulated microcontroller on the FPGA 326 then operates in lock step with the DUT 335 microcontroller.

Debug Software 312 stored in the host computer 310 memory contains instructions for applying power to the DUT 335 from the ICE power grid 325. Testing is initiated with the ICE power grid 325 active but not coupled to the DUT 335. The Debug Software 312 performs an acquire of the DUT 335 and looks for an activity indicator. Detection of an activity indicator such as a clock indicates activation of the DUT 335 due to the application of power from an external source 340.

In the presence of an activity indicator, a signal is generated to prevent application of power from the ICE power grid 325 to the DUT 335 and testing under control of the Debug Software 312 continues. In one embodiment of the present invention, the generated signal causes a bit to be stored in the host computer 310 memory to indicate activation of the DUT 335 by an external power source 340. If an activity indicator such as a clock is not present, external power 340 is not being supplied to the DUT 335. The ICE power grid 325 is then coupled to the DUT 335, and after the application of power the Debug Software 312 looks for an activity indicator.

Detection of an activity indicator such as a clock indicates activation of the DUT 335 due to the application of power from the ICE power grid 325, and testing under control of the Debug Software 312 continues. The absence of an activity signal from the DUT 335 after the application of power from the ICE power grid 325 is an indication of a fault condition concerning the DUT 335. Power from the ICE power grid 325 is then removed from the DUT 335. A signal is generated to indicate the existence of a fault condition and the Debug Software 312 halts testing of the DUT 335. In one embodiment of the present invention, the generated signal causes a bit to be stored in the host computer 310 memory to indicate a fault condition relative to the DUT 335.

In one embodiment of the present invention, the simultaneous application of power to the DUT 335 from the ICE power grid 325 and an external power source 340 is thereby prevented. Furthermore, the automatic removal of power applied to a faulty DUT 335 or a faulty DUT condition is realized.

Figure 4:
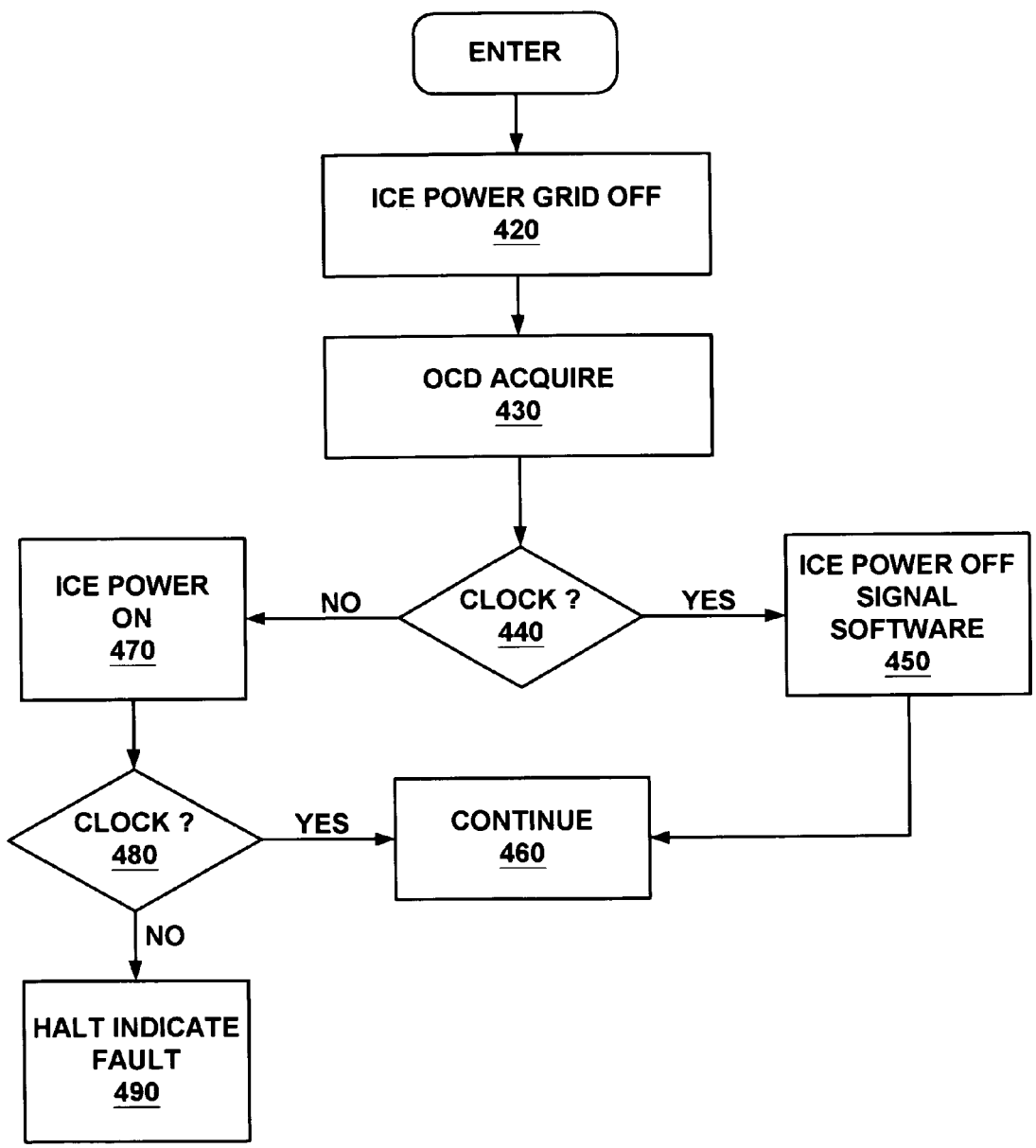
FIG. 4 illustrates a flow diagram of computer implemented steps for supervising the coupling of power to a test circuit according to one embodiment of the present invention.

FIG. 4 illustrates a flow diagram 400 of computer implemented steps for supervising the coupling of power to a DUT according to one embodiment of the present invention. A DUT residing on a pod is coupled to an ICE under the control of a computer. In one embodiment, the ICE is coupled to the pod using a CAT5 cable. The ICE has a power grid capable of supplying the necessary power to activate the DUT and software referred to as the Debug Software stored in the computer contains instructions for applying power from the ICE. Provisions for coupling an external power source to the pod for the purpose of supplying power to the DUT are also present. The flow diagram illustrates the steps taken to prevent the simultaneous application of power to the DUT from the ICE power grid and an external source.

Testing is initiated in step 420 with the ICE power grid active but not coupled to the DUT. The Debug Software performs an acquire of the DUT in step 430 and looks for an activity indicator in step 440. Detection of a signal such as a clock indicates activity of the DUT due to the application of power from an external source and the system proceeds to step 450. In step 450 a signal is generated to prevent application of power from the ICE power grid to the DUT. In one embodiment of the present invention the generated signal causes a bit to be stored in the host computer memory to indicate activation of the DUT by an external power source. The system then proceeds to step 460 where testing under control of the Debug Software continues.

If an activity indicator such as a clock is not present in step 440, external power is not being supplied to the DUT and the algorithm proceeds to step 470. The ICE power grid is coupled to the DUT in step 470, and after the application of power the Debug Software looks for an activity indicator in step 480.

The detection of a signal such as a clock in step 480 indicates activity of the DUT due to the application of power from the ICE power grid in step 470. The system then proceeds to step 460 where testing under control of the Debug Software continues.

The absence of an activity signal from the DUT in step 480 after the application of power from the ICE power grid is an indication of a fault condition concerning the DUT. The system then proceeds to step 490 wherein power from the ICE power grid is removed from the DUT. Also, in step 490 a signal is generated to indicate the existence of a fault condition and testing of the DUT is halted. In one embodiment of the present invention, the generated signal causes a bit to be stored in the host computer memory to indicate a fault condition relative to the DUT.

In one embodiment of the present invention, the simultaneous application of power to the DUT from the ICE power grid and an external power source is thereby prevented. Furthermore, the automatic removal of power applied to a faulty DUT or a faulty DUT condition is realized.

Figure 5:
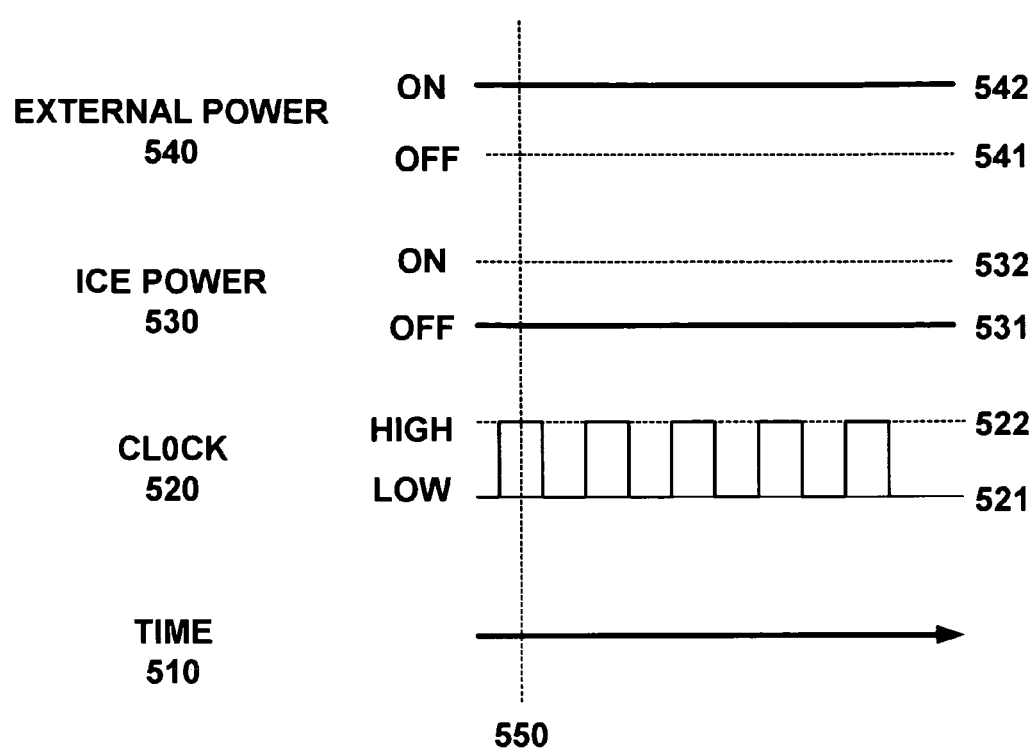
FIG. 5 illustrates a timing diagram of signals when external power is applied to the emulator pod according to one embodiment of the present invention.

A timing diagram 500 showing externally applied power 540 coupled to a DUT in the absence of power from the ICE power grid 530 and a DUT activity signal 520 is illustrated in FIG. 5. A time line 510 illustrates increasing time in a direction from left to right. Testing of the DUT begins at point 550 on the time line 510 when the Debug Software performs an acquire. The external power 540 has an off level 541 and an on level 542 illustrating the application of external power. The ICE power grid 530 has an off level 531 and an on level 532 illustrating the absence of power from the ICE power grid. In one embodiment, the DUT activity signal 520 is a clock with high-low activity levels 522–521 respectively illustrating DUT activity. In this instance, shortly after point 550 on the time line, the system detects the activity signal, causes a bit to be stored in system software indicating externally applied power and preventing the application of ICE grid power, and proceeds with testing.

In one embodiment of the present invention, the simultaneous application of power to the DUT from the ICE power grid 530 and an external power source 540 is thereby prevented. Furthermore, the automatic removal of power applied to a faulty DUT or a faulty DUT condition is realized.

Figure 6:
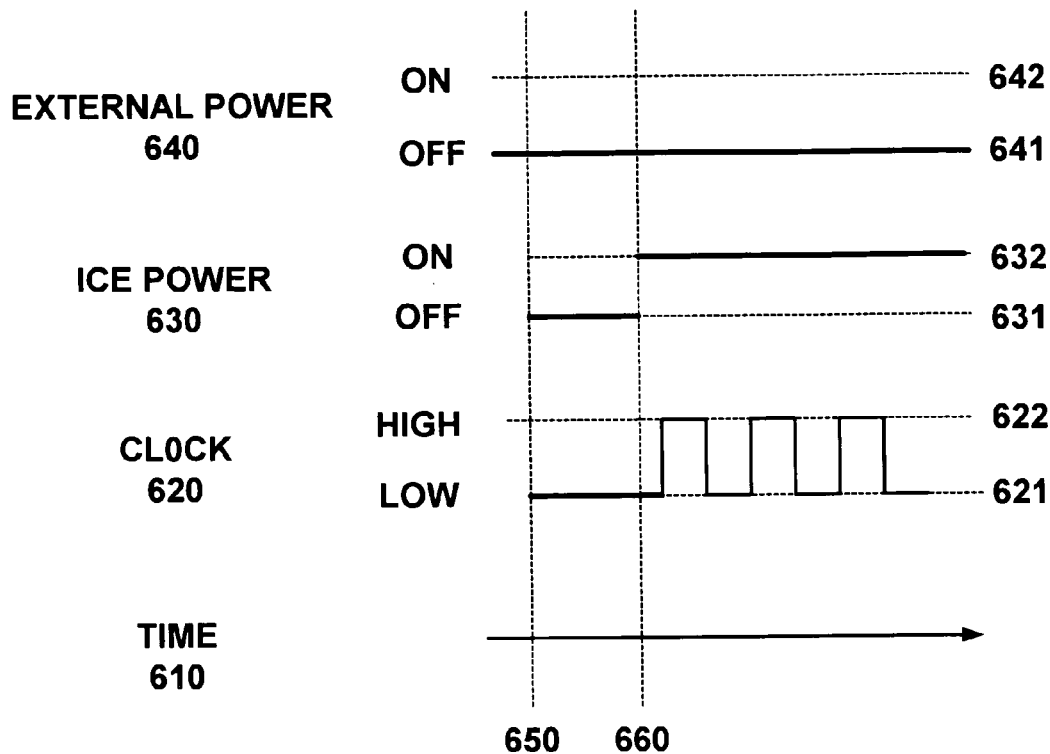
FIG. 6 illustrates a timing diagram of signals when external power is not applied to the emulator pod according to one embodiment of the present invention.

A timing diagram 600 showing power from the ICE power grid 630 coupled to a DUT in the absence of externally applied power 640 and a DUT activity signal 620 is illustrated in FIG. 6. A time line 610 illustrates increasing time in a direction from left to right. Testing of the DUT begins at point 650 on the time line 610 when the Debug Software performs an acquire.

Prior to point 650 on the time line, the external power 640 has an off level 641 and an on level 642 illustrating the absence of external power. The ICE power grid 630 has an off level 631 and an on level 632 illustrating the absence power from the ICE power grid. A DUT activity signal 620 illustrated as a clock with high-low activity levels 622–621 respectively shows a lack of DUT activity.

In this instance, shortly after point 650 on the time line, the system detects the absence of an activity signal 620, which indicates the absence of external power 640 applied to the DUT. Power from the ICE power grid 630 is then applied to the DUT and the system looks for a DUT activity signal 620. The activity signal 620 appears at point 660 on the time line 610 and the system proceeds with testing.

In one embodiment of the present invention, the simultaneous application of power to the DUT from the ICE power grid 630 and an external power source 640 is thereby prevented. Furthermore, the automatic removal of power applied to a faulty DUT or a faulty DUT condition is realized.

Figure 7:
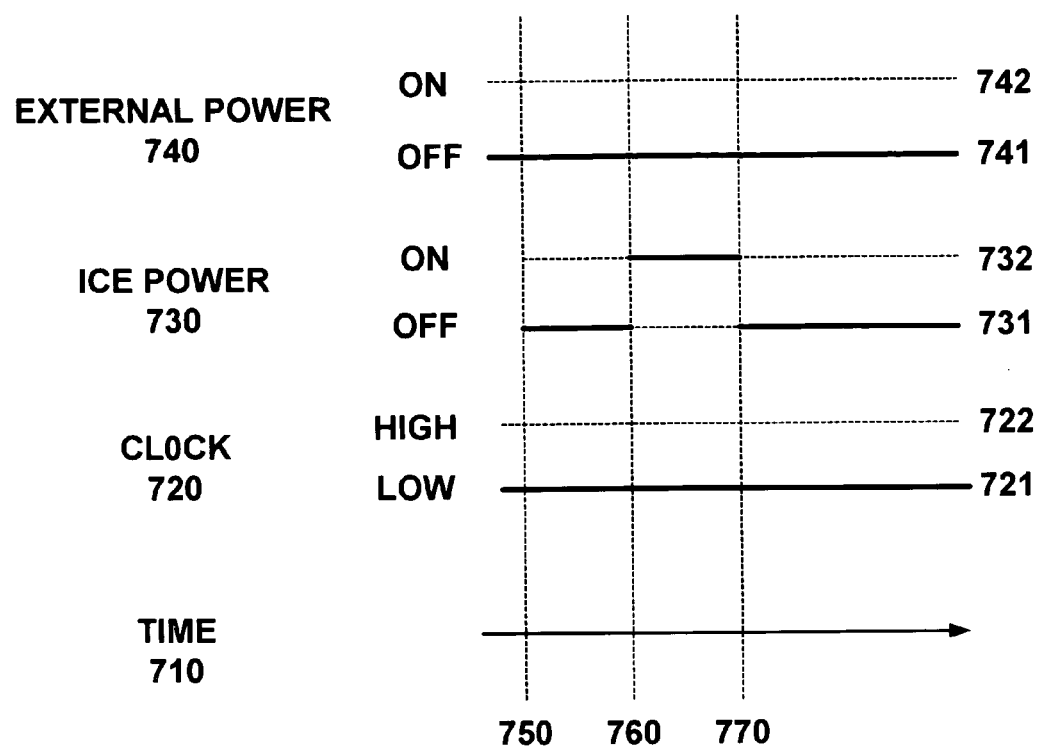
FIG. 7 illustrates a timing diagram of signals showing a fault condition on the emulator pod according to one embodiment of the present invention.

A timing diagram 700 showing power from the ICE power grid 730 coupled to a DUT in the absence of externally applied power 740 and a DUT activity signal 720 is illustrated in FIG. 7. A time line 710 illustrates increasing time in a direction from left to right. Testing of the DUT begins at point 750 on the time line 710 when the Debug Software performs an acquire.

Prior to point 750 on the time line, the external power 740 has an off level 741 and an on level 742 illustrating the absence of external power. The ICE power grid 730 has an off level 731 and an on level 732 illustrating the absence power from the ICE power grid. A DUT activity signal 720 illustrated as a clock with high-low activity levels 722–721 respectively shows a lack of DUT activity.

In this instance, shortly after point 750 on the time line, the system detects the absence of an activity signal 720, which indicates the absence of external power 740 applied to the DUT. Power from the ICE power grid 730 is then applied to the DUT at point 760 on the time line 710, and the system looks for a DUT activity signal 720. The activity signal 720 fails to appear, and at point 770 on the time line 710 the system removes ICE power 730 from the DUT and halts testing. The system also causes a bit to be stored in system software indicating a fault in the DUT or in the DUT configuration.

In one embodiment of the present invention, the simultaneous application of power to the DUT from the ICE power grid 730 and an external power source 740 is thereby prevented. Furthermore, the automatic removal of power applied to a faulty DUT or a faulty DUT condition is realized.

The preferred embodiment of the present invention, external power detect and supply, is thus described. While the present invention has been described in particular embodiments, it should be appreciated that the present invention should not be construed as limited by such embodiments, but rather construed according to the below claims.

What is claimed is:

1. A power supply over-drive protection system for a DUT comprising:
   a processor coupled to a memory via a bus, said memory having instructions that when executed implement a method of monitoring power coupled to said DUT comprising:
   a) determining whether a clock signal from a DUT is received, said clock signal generated by said DUT when said DUT is coupled to an external power source;
   b) if said clock signal is received in a), generating a signal for preventing the coupling of power to said DUT from an in circuit emulator;
   c) if said clock signal is not received in a), coupling power to said DUT from said in circuit emulator;
   d) if said clock signal is not received in response to c), decoupling power to said DUT from said in circuit emulator and generating a fault condition signal.

2. A system as described in claim 1 wherein said DUT is a microcontroller.

3. A system as described in claim 1 wherein said DUT is located on a pod configured to couple said DUT to a power source in said in circuit emulator.

4. A system as described in claim 1 wherein said step a) and said step d) are configured to prevent a simultaneous coupling of said DUT to more than one power source.

5. A system as described in claim 1 wherein said DUT is located on a pod coupled to said in circuit emulator using a cable.

6. A system as described in claim 1 wherein said fault condition signal comprises setting a memory location bit to indicate a fault occurrence.

7. A method for protecting a DUT from a power supply over-drive condition comprising:
   a) determining whether an activity signal from a DUT is received, said activity signal generated by said DUT when said DUT is coupled to an external power source, wherein said DUT is a microcontroller;
   b) if said activity signal is received in a), generating a signal for preventing the coupling of power to said DUT from an in circuit emulator;
   c) if said activity signal is not received in a), coupling power to said DUT from said in circuit emulator;
   d) determining whether said activity signal is received in response to c); and
   e) if said activity signal is not received in d), decoupling power to said DUT from said in circuit emulator and generating a fault condition signal.

8. A method as described in claim 7 wherein said DUT is located on a pod configured to couple said DUT to a power source in said in circuit emulator.

9. A method as described in claim 7 wherein said step a) and said step d) are configured to prevent a simultaneous coupling of said DUT to more than one power source.

10. A method as described in claim 7 wherein said activity signal from said DUT is a clock signal.

11. A method as described in claim 7 wherein said DUT is located on a pod coupled to said in circuit emulator using a cable.

12. A method as described in claim 7 wherein said fault condition signal comprises setting a memory location bit to indicate a fault occurrence.

13. An external power detection and power supply over-drive protection system for a DUT comprising:
   a host computer system;
   an in circuit emulator coupled to said host computer system, said in circuit emulator having an in circuit emulator power source for activating a DUT, wherein said in circuit emulator comprises a field programmable gate array capable of emulating said DUT;
   a pod coupled to said in circuit emulator and coupled to said DUT; and
   an external power source for activating said DUT;
   wherein said host computer system includes a memory having computer readable instructions that when executed by the host computer system implement a method of supervising the coupling of power to said DUT comprising:
   a) detecting whether an activity signal is generated by said DUT, said activity signal caused by coupling said DUT to said external power source;
   b) if said activity signal is detected in a), generating a signal for preventing the coupling said DUT to said in circuit emulator power source;
   c) if said activity signal is not detected in a), coupling said in circuit emulator power source to said DUT; and
   d) in response to c), if said activity signal is not detected, decoupling power to said DUT from said in circuit emulator power source and generating a fault signal.

14. A system according to claim 13 wherein said DUT is a microcontroller.

15. A system according to claim 13 wherein said activity signal from said DUT is a clock signal.

16. A system according to claim 13 wherein said DUT is located on a pod coupled to said in circuit emulator by a CAT 5 cable.

17. A system according to claim 13 wherein said fault signal comprises a bit set in a memory location recognizable as said fault signal.

* * * * *